Patented Dec. 19, 1944

2,365,217

UNITED STATES PATENT OFFICE 2,365,217

METHOD OF MAKING BUTTER

Charles A. Rogers, Detroit, Mich.

No Drawing. Application August 2, 1940,
Serial No. 350,086

5 Claims. (Cl. 99—119)

This invention relates to the making of butter and has for its principal object the provision of an improved process by the practice of which a superior product will result.

Objects of the invention include, in the preparation of sour cream for use in the manufacture of butter or for other purposes, the step of pasteurizing cream with live steam before the acidity of the cream has been materially reduced; the provision of a process for preparing sour cream for use in the manufacture of butter or for other purposes including the steps of pasteurizing the cream before material standardization of the acid content thereof and then standardizing the acid in the cream after pasteurization; the provision of a method of making butter including the steps of pasteurizing sour cream with live steam, standardizing the acid in the pasteurized cream, and then churning the cream to make butter; the provision of a method of treating sour cream as above set out in which the cream, after pasteurization and before standardization of acidity is subjected to a centrifugal clarifying operation; the provision of a method of treating sour cream as above set out in which the clarification step is accomplished by passing the cream through a centrifugal clarifier or other device designed to accomplish physical separation of liquids and/or solids that may contain two or more substances of different specific gravities permitting separation of their constituents by submission to centrifugal force; and the provision of a method of treating sour cream including the steps of pasteurizing the cream at a pressure above or below atmospheric and then discharging it at a temperature of between 150° F. and 350° F. into one or more chambers under the influence of a partial vacuum, then passing the treated cream, either in a hot or cold state, through a centrifugal clarifier, and subsequently standardizing the acid content of the cream.

The above being among the objects of the present invention the same consists in certain novel steps of operation and combinations of such steps in the preparation of sour cream for the purpose of making butter or for other uses, as well as to certain steps and combinations of steps of operation upon sour cream ultimately subjected to a churning operation to produce butter.

While the present invention is primarily concerned with the manufacture of butter from sour cream, certain steps in the preparation of the cream enhancing its value in the ultimate conversion thereof into butter are also of value whether the cream is eventually turned into butter or is employed for some other use and, accordingly, as far as such steps of operation are concerned the present invention is not limited solely to, but does include, the employment thereof in cases where the cream is eventually to be churned into butter, and this is to be kept in mind throughout the following specification and claims in which reference will principally be made to the production of butter as this appears to be the principal field of use at the present time.

The term "sour cream" refers to cream that has undergone certain fermentations, chiefly the conversion of part of the lactose present in milk and cream into lactic acid by the activity of certain micro-organisms. Cream obtained from milk immediately after it has been drawn from the udder of a healthy cow contains no lactic acid as such; however, employing phenolphthalein as an indicator and titrating a portion of such cream with standardized sodium hydroxide or potassium hydroxide, a value is expressed as percent acidity calculated as lactic acid. This is only apparent acidity since some of the minerals, acid salts and carbon dioxide readily combine with the titrating alkali whereas no actual lactic acid has yet been produced. Real acidity is manifested some time after the cream has been produced, the factors influencing this production including time and temperature. Lactic acid bacteria are predominant in the flora usually found in cream and under favorable conditions with respect to temperatures, the production of lactic acid progresses very rapidly. For the purpose of the invention a clear distinction should be made from cream where only apparent acidity is present or the pH is within the range for cream without actual acidity, with that cream that has undergone the fermentative changes of converting some of the lactose into lactic acid, and the term "sour cream" will be understood in the accompanying specification and claims as cream that contains any measurable quantity of lactic acid as measured by either titration or hydrogen ion concentration and that the acidity is real, rather than apparent.

Since other acids and acid salts are found in the cream during the normal souring or fermentation, lactic acid is present with free fatty acids, propionic, acetic and others.

Sour cream employed in the manufacture of butter and for other purposes usually contains material quantities of lactic acid. Such cream as received by creameries unavoidably includes a material amount of foreign material which may consist of dust, sand, silt and other foreign material picked up from the surrounding air, from containers and in handling, minute particles of flesh discharged from the cows' udders with the milk, insects and other minute particles subject to putrefaction, as well as molds, yeast and other micro-organisms. Sufficiently complete removal of such material prior to pasteurization by a centrifugal clarification process is commercially impractical as is well understood by those skilled in the art.

Conventional practice in the manufacture of butter from sour cream includes the step of standardizing the acid in the cream before pasteurization.

Standardization of the acid present in the cream is analogous with the practice of neutralization or neutralizing, which consists essentially of adding definite quantities of compounds of alkaline reaction of known strength to a given amount of cream containing a predetermined quantity of acid calculated as lactic acid before pasteurization. The common practice is to reduce or adjust the acidity in the cream so the pH of the butter sera will fall within a range of 5.5 to 7.5. The reasons for such acid adjustment are:

1. Less fat losses in buttermilk.
2. Prevent a burned, scorched flavor of butter.
3. Improve keeping quality of butter.

The standardization or adjustment of acidity may be accomplished by the addition of various kinds and mixtures of acid reducing agents which by the way of illustration but not by way of limitation may be sodium hydroxide, soda ash, sodium bicarbonate, calcium oxide or hydroxide, magnesium oxide or hydroxide, or others.

If the acid reduction or adjustment is carried to the point where the pH of the butter sera exceeds 7.5 the resulting butter possesses an undesirable alkaline flavor and poor keeping quality in storage, rendering the resulting product of low commercial value.

Attempts have been made to clarify sour cream, the acidity of which has been standardized and then pasteurized in accordance with conventional practice, with centrifugal clarifiers, but such attempts have been unsuccessful, with one exception, for the reason that the clarifiers have been almost immediately clogged up by a very dry, tough rubbery sludge of an appearance and texture closely resembling the characteristics of cheddar cheese during the matting process. This sludge consists, to a great extent, of calcium caseinate or other casein compounds, and free lime where lime is used as a neutralizer, which is precipitated during the neutralizing operation. Such sludge can be torn from the clarifier bowl in strips or hunks, not unlike the appearance of white meat torn from the breast of a chicken that has been fried or baked. It is of a character and consistency absolutely precluding its elimination in centrifugal clarifiers, either those of the closed bowl type or those types of so-called self-emptying centrifugal clarifiers and requires partial disassembly of the clarifier to remove the sludge. In the accompanying specification and claims the term "centrifugal clarifier" contemplates any device designed to accomplish physical separation of liquids and/or solids that may contain two or more components of different specific gravities permitting separating of their constituents, by centrifugal force. When it is understood that the passage of approximately twenty gallons of sour cream, the acidity of which has been standardized prior to pasteurization in accordance with conventional practice, is sufficient to clog a centrifugal clarifier of standard design and construction having a rated capacity of approximately forty gallons of sweet milk a minute to such an extent as to render its clarifying action no longer efficient, the impossibility of commercially clarifying such cream by such method is readily understood. Clarification by a filter bed, press or the like as differentiated from a centrifugal clarifier is impractical because of the length of time required for the operation, the high cost of operation and maintenance, added cost of floor space and equipment required and general inefficiency of operation.

The one exception referred to above is where sour cream is fully neutralized to an alkaline state with a compound containing sodium ions to a pH value in excess of 7.5 of the butter sera, in which case the process is commercially impractical because of the resulting alkaline or soapy taste and poor keeping qualities.

Many creameries manufacture either or both condensed or powdered buttermilk as a by-product for stock feeds and for other uses. It is known that sodium caseinate decomposes and undergoes certain undesirable changes at lower temperatures than calcium caseinate, hence when buttermilk is dried or condensed, the sodium caseinate formed where sodium compounds are used to standardize the acid content of the cream, appears as a brown sticky gummy mass that hardens after exposure to the air. This is another reason why neutralizing sour cream with sodium compounds is impractical.

If pasteurization is accomplished before the acidity is standardized by ordinary and common heat exchange pasteurizers, employing heated tubes or other heated surfaces to effect the transfer of heat to sour cream, certain disadvantages are encountered when the cream is churned into butter, viz. (1) high churning losses; (2) resulting butter possesses a burned or scorched flavor due to the presence of burned precipitated casein; (3) the butter possesses poor keeping qualities. Pasteurization of cream as contemplated herein is defined to mean a process in which the sour cream is subjected to such temperatures and for such time as to destroy pathogenic bacteria.

In accordance with the present invention it has been discovered that if pasteurization of sour cream is accomplished by live steam led into direct contact with the cream, which may be under pressure either above or below atmospheric, the disadvantage of pasteurization by the use of common or ordinary forms of heat exchangers is largely eliminated.

It has also been discovered that if pasteurization is carried out before neutralization, whether by conventional form of heat exchangers or by live steam, the resulting product has great advantages over cream that has been neutralized before pasteurization. Obviously, however, to get the greatest benefit because of this change in conventional procedure, the pasteurization should be accomplished by direct contact with live steam, as by this method of pasteurization the precipitates have a different character and are present in lesser amounts than when pasteurized in the conventional manner.

Without limiting the process of the present invention to the pasteurization of sour cream either above or below atmospheric pressure, preferably but not necessarily by direct contact with steam as by the addition or admixture of steam therewith, it has been discovered that by subjecting the hot cream so pasteurized to the influence of a partial vacuum, as by passing the hot cream from the pasteurization directly into one or more chambers under a sufficient partial vacuum to effect a flash vaporization of certain constituents thereof, important physical and chemical changes occur in the several constituents of the cream. Such pasteurization may be carried on at any temperature between 150° F. and 350° F. and the partial vacuum to which such cream is subjected is preferably such that, at its existing temperature, flash vaporization of at least certain constituents thereof, as well as some cooling of the entire mass, will occur. The advantages of such process are:

1. The proteins normally precipitated by the formation of lactic acid in the cream and the proteins further precipitated when exposed to pasteurizing temperatures are very finely dispersed and broken up mechanically and physically when the hot cream is subjected to the influence of partial vacuum. Further, it can be stated that this step results in an effect upon the cream similar to atomizing, reducing the size of the protein particles and dispersing them throughout the cream in a finely divided form, thus permitting a material amount of acid and heat precipitated casein to pass through a centrifugal clarifier whereas, where such pasteurized cream is not subjected to the vacuum step described the casein would be of such character as to more readily clog the bowl and other parts of the centrifugal machine.

2. Another advantage to this vacuum treatment consists in a fine dispersion of the fat globules in the cream, thereby more completely separating the two important cream constituents from each other, both in partial or wholly colloidal state. The advantage accrues in this respect that negligible amounts of fat are entrained in the protein precipitated by the heat treatment and subsequently lost.

In standardizing the acidity after pasteurization the relatively violent chemical and physical changes in the cream occurring when the acid is standardized before pasteurization do not occur to nearly as great an extent and far less precipitation occurs. This last fact is of importance due to the fact that the precipitates carried with the buttermilk occurring when standardization of the acidity is carried out before pasteurization contain a large amount of butter fat which is wasted and, accordingly, a considerable amount of which is saved when standardization is accomplished after pasteurization in accordance with the present invention. In fact, the precipitates occurring when standardization of the acid is accomplished after pasteurization, and particularly where the pasteurized cream is subjected to a partial vacuum as above described, are of such different character than the precipitates occurring when sour cream is treated in accordance with conventional practice that the amount of cream which may be passed through a centrifugal clarifier of the closed bowl type, of the capacity previously described before reaching a point requiring cleaning out of the sludge, is increased to 300 to 450 or more gallons, depending upon the particular cream being processed, as compared to approximately twenty gallons of cream processed in accordance with conventional practice. More important, however, is the fact that the resulting separated out matter or sludge is of a finely divided character and rather mushy. It may be readily discharged from conventional types of self-emptying centrifugal clarifiers and the commercial and satisfactory use of those types is readily possible without the necessity of shutting down for periodic cleaning. The clarifying may thus be accomplished in a quick and efficient manner by existing apparatus. The sludge formed in the clarifier by this new process consists largely of acid and heat precipitated casein and the extraneous materials that have gained entrance to the cream during production. The removal of some of the inclusions mentioned may not be greatly important, except for the possible effects they may have on the taste of the resulting product, inasmuch as most micro-organisms have been killed in the pasteurization, but the result is a cleaner and better product.

In standardizing the acidity of the cream as above described the acid reducing agents may be introduced into the cream after pasteurization, or if the cream is to be clarified, during any stage of operation subsequent to the clarifying step.

Butter made from cream processed in accordance with the present invention, including the clarifying step, rates a higher score, calculated in accordance with the official United States standards for creamery butter, promulgated Nov. 3rd, 1938 by the United States Department of Agriculture, Bureau of Agricultural Economics, than when made from identical cream processed in accordance with conventional practices. In fact, butter made from sour cream in accordance with the present invention has some of the favorable characteristics of butter made from sweet cream. In addition, cream processed in accordance with the present invention, and butter and other products made from such cream, possesses materially less of a neutralizer flavor so conspicuous in high acid cream than butter made therefrom in accordance with conventional practice. One reason for this is that the acid content is materially reduced mechanically before standardization, thus reducing the amount of neutralizer required. Furthermore, in butter made in accordance with the practices of the present invention, the fat globules in the cream are acted upon in such a manner as to make them of more uniform size, thus reducing the churning losses as compared to conventional practices.

From the above it will be appreciated that by the practices of the present invention sour cream may be pasteurized and the acidity thereof reduced in such a manner as to improve the taste and other qualities of the resulting product, that the resulting product is so much more free of extraneous materials as compared to such cream processed in the conventional manner as to render the clarification thereof commercially practicable with existing apparatus, that butter made with cream processed in accordance with the present invention has a higher score than butter made from identical cream when processed by conventional methods, and particularly where the acidity is standardized after pasteurization the resulting butter carries a higher score, is devoid of neutralizer flavors, and where clarified is devoid of foreign inclusions to a considerably greater extent than butter produced from equivalent cream in accordance with conventional practices.

What is claimed is:

1. In processing sour cream, the steps of pasteurizing the cream by direct contact with live steam, and then subjecting said cream to the action of a centrifugal clarifier, and thereafter standardizing the acid content of said cream only after clarification.

2. In the manufacture of butter from sour cream, the steps of pasteurizing said cream, clarifying said pasteurized cream and then standardizing the acid content of the pasteurized cream, and then churning said clarified and standardized cream.

3. In the processing of sour cream, the steps of first pasteurizing said cream, subjecting the cream substantially at the temperature to which it is raised in the pasteurizing step to the influence of a partial vacuum, then centrifugally clarifying said cream, and thereafter standardizing the acidity of the cream.

4. In the processing of sour cream, the steps of pasteurizing said cream by subjecting it to a heating operation until its temperature is raised to a value of between 150° F. and 350° F., then subjecting the cream substantially at its pasteurizing temperature to the effects of such partial vacuum as to effect partial flash vaporization and partial cooling of the cream, then subjecting said cream to a centrifugal clarifying operation, and thereafter standardizing the acid content of said cream.

5. In the processing of sour cream carrying obnoxious flavors and odors, the steps of pasteurizing said cream before standardizing the acid thereof, subjecting the cream at substantially the temperature at which it is pasteurized to the effects of a vacuum whereby to remove said flavors and odors from and cool said cream, then clarifying said cream, then standardizing the acid content of said cream, and then churning said cream to form butter.

CHARLES A. ROGERS.

---

CERTIFICATE OF CORRECTION.

December 19, 1944.

Patent No. 2,365,217.

CHARLES A. ROGERS.

It is hereby certified that error appears in the printed specification of the above numbered patent requiring correction as follows: Page 2, second column, line 7, for "approxmiately" read --approximately--; page 3, first column, line 42, claim 2, for "accures" read --accrues--; page 4, first column, line 3-4, claim 1, strike out the words "only after clarification"; and that the said Letters Patent should be read with this correction therein that the same may conform to the record of the case in the Patent Office.

Signed and sealed this 27th day of March, A. D. 1945.

Leslie Frazer

Acting Commissioner of Patents.

(Seal)

steam, and then subjecting said cream to the action of a centrifugal clarifier, and thereafter standardizing the acid content of said cream only after clarification.

2. In the manufacture of butter from sour cream, the steps of pasteurizing said cream, clarifying said pasteurized cream and then standardizing the acid content of the pasteurized cream, and then churning said clarified and standardized cream.

3. In the processing of sour cream, the steps of first pasteurizing said cream, subjecting the cream substantially at the temperature to which it is raised in the pasteurizing step to the influence of a partial vacuum, then centrifugally clarifying said cream, and thereafter standardizing the acidity of the cream.

4. In the processing of sour cream, the steps of pasteurizing said cream by subjecting it to a heating operation until its temperature is raised to a value of between 150° F. and 350° F., then subjecting the cream substantially at its pasteurizing temperature to the effects of such partial vacuum as to effect partial flash vaporization and partial cooling of the cream, then subjecting said cream to a centrifugal clarifying operation, and thereafter standardizing the acid content of said cream.

5. In the processing of sour cream carrying obnoxious flavors and odors, the steps of pasteurizing said cream before standardizing the acid thereof, subjecting the cream at substantially the temperature at which it is pasteurized to the effects of a vacuum whereby to remove said flavors and odors from and cool said cream, then clarifying said cream, then standardizing the acid content of said cream, and then churning said cream to form butter.

CHARLES A. ROGERS.

---

CERTIFICATE OF CORRECTION.

Patent No. 2,365,217.　　December 19, 1944.

CHARLES A. ROGERS.

It is hereby certified that error appears in the printed specification of the above numbered patent requiring correction as follows: Page 2, second column, line 7, for "approxmiately" read --approximately--; page 3, first column, line 42, claim 2, for "accures" read --accrues--; page 4, first column, line 3-4, claim 1, strike out the words "only after clarification"; and that the said Letters Patent should be read with this correction therein that the same may conform to the record of the case in the Patent Office.

Signed and sealed this 27th day of March, A. D. 1945.

Leslie Frazer

Acting Commissioner of Patents.

(Seal)